United States Patent [19]

Lawrence et al.

[11] 3,745,258

[45] July 10, 1973

[54] ADJUSTABLE REVERSIBLE TELECOMMUNICATION CODE SIGNAL CONVERTER

[75] Inventors: Laurence William David Lawrence, Burlington, Ontario, Canada; Brian Goodwill Wells, Wollaton, England; Colin Bunting, Wilford, England; John Dawson, Kirkby-in-Ashfield, England

[73] Assignee: Plessey Handel und Investments A.G., Zug, Switzerland

[22] Filed: Oct. 12, 1971

[21] Appl. No.: 188,316

[30] Foreign Application Priority Data

Oct. 15, 1970 Great Britain .................. 48,982/70

[52] U.S. Cl. .......................... 179/18 FH, 179/18 ET

[51] Int. Cl. ............................................ H04q 3/72

[58] Field of Search ..................... 179/18 ET, 18 FH

[56] References Cited

UNITED STATES PATENTS 3,280,268 10/1966 Drake et al. .................... 179/18 FH 3,231,680 1/1966 Yamato et al. ................. 179/18 FH

*Primary Examiner*—Thomas W. Brown

*Attorney*—Alex Friedman, Harold I. Kaplan et al.

[57] ABSTRACT

Telecommunication signal conversion apparatus for converting a single pulse signal at an individual terminal into a complex signal – representing for example a subscriber's directory number – comprising a succession of two-out-of-five elements on a common highway, and vice versa, in dependence on adjustments made to the apparatus.

The apparatus (FIG. 1) comprises an adjustable converter (e.g. SC1) for each subscriber's line, a converter being adjusted to the number of the line it represents. A converter comprises a jack-in card (2) carrying an integrated circuit chip (7) which accommodates the circuitry, and adjustment plugs (3) representing digit values which are plugged on to the card as required.

3 Claims, 12 Drawing Figures

Fig. 2.
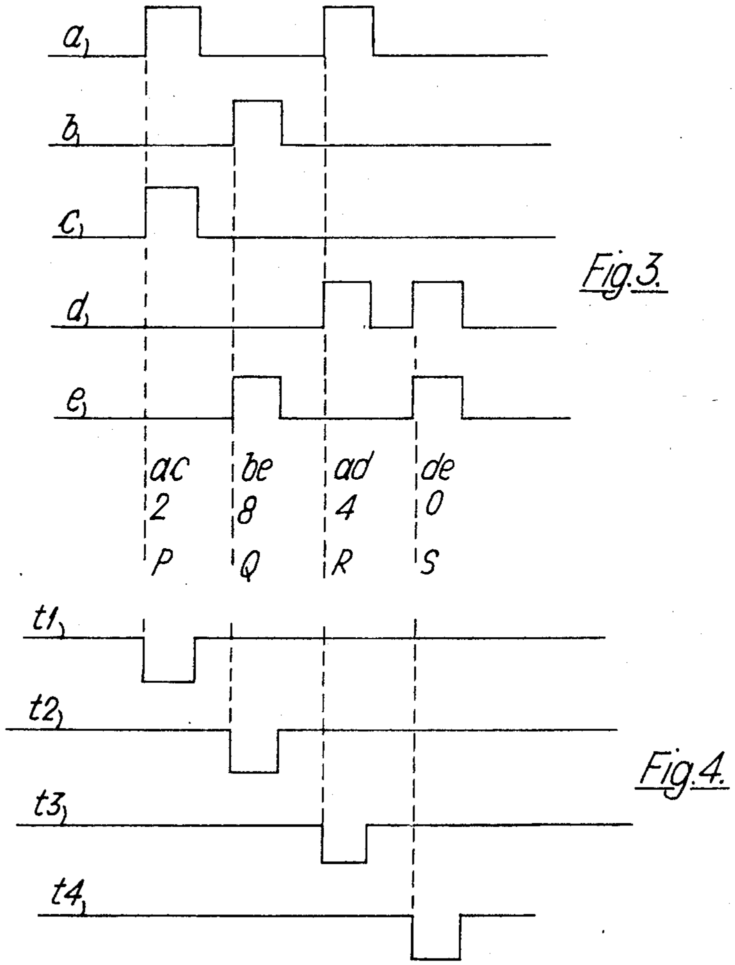
Fig. 3. Fig. 4.
| ab | ac | bc | ad | bd | cd | ae | bc | ce | de |
|---|---|---|---|---|---|---|---|---|---|
| 1 | 2 | 3 | 4 | 5 | 6 | 7 | 8 | 9 | 0 |
Fig. 5.

Patented July 10, 1973 3,745,258

9 Sheets-Sheet 3

ADJUSTABLE REVERSIBLE TELECOMMUNICATION CODE SIGNAL CONVERTER

This invention relates to telecommunication signal converters.

According to the invention there is provided an adjustable telecommunication signal converter operable firstly to convert a single pulse input signal received thereat into a complex signal comprising a succession of signal elements delivered over a group of conductors, each element including one or more pulses applied respectively to one or more conductors of the group selected in dependence on an adjustment of the converter, and secondly to convert a complex signal received at the converter into a single pulse output signal if the conductors of the group to which the pulses of the elements of the received signal are applied correspond to the conductors selected in dependence on the adjustment to which the converter has been adjusted, which converter includes adjustment means adjustable to determine the adjustment to which the converter is adjusted and to select in respect of each pulse of an element of a complex signal delivered by the converter a conductor of the group to which a pulse is applied; delivery gates repeatedly and selectively operable on the receipt of a single pulse input signal to deliver at each operation an element of a complex signal whose pulses are applied to conductors selected in dependence on the adjustment of the adjustment means; correspondence gates operable to generate a correspondence signal in response to each element of a received complex signal if the pulses included in an element are applied to conductors which correspond to conductors selected in dependence on the adjustment of the adjustment means; and a stepping train having a number of steps equal to the number of elements in a complex signal, the stepping train advancing one step in response to a correspondence signal and achieving the final step only if a correspondence signal is generated in respect of each element of a received complex signal, a single output pulse signal being delivered when the stepping train achieves the final step.

Conveniently the delivery gates, the correspondence gates and the stepping train are accommodated on an integrated circuit chip.

According to the invention there is also provided adjustable telecommunication signal conversion apparatus which includes an array of independently adjustable signal converters as described above, an input terminal corresponding to each converter of the array and individually connected thereto, an output terminal corresponding to each converter of the array and individually connected thereto, a delivery group of conductors multipled over the converters of the array and a receive group of conductors multipled over the converters of the array, the apparatus responding firstly to a single pulse input signal received at an input terminal to deliver a complex signal at the delivery group of conductors, the pulses of the elements of the delivered complex signal being applied to conductors selected in dependence on the adjustment of the adjustment means of the converter to which the said input terminal is connected, and secondly to a complex signal received over the receive group of conductors to deliver a single pulse output signal at the output terminal connected to that converter of the array whose stepping train is advanced to the final step by correspondence signals relating to the elements of the received complex signal.

The converters and apparatus mentioned above are particularly useful if the complex signals represent telephone numbers. In these conditions it is possible to generate a complex signal representing a calling subscriber's number in response to a single pulse signal developed when the subscriber initiates a call. It is also possible to convert a complex signal representing a wanted subscriber's number into a single pulse signal applied to a terminal individual to the wanted subscriber's line. It is convenient to describe the invention in this context. The signal conversion from the single pulse signal to the complex signal might also be classified as encoding, while the complex signal to single pulse signal conversion might be referred to as decoding. This encoding and decoding capability makes the apparatus in accordance with the invention capable of performing the function of the devices referred to in the prior art as identifiers. In the description reference will be made to the accompanying drawings in which:

FIG. 2 represents a single pulse signal, FIG. 3 illustrates one form of complex signal, FIG. 4 is a chart of time pulses used in connection with the complex signal of FIG. 3.

FIG. 5 is a two-out-of-five code used in connection with the complex signal of FIG. 3.

FIGS. *6a*, *6b* when placed side by side with FIG. *6a* on the left, show signal conversion apparatus according to the invention which is compatible with the complex signal of FIG. 3, logic symbols being used to illustrate circuit functions, FIGS. 7–10 show circuits employing metal oxide silicon transistors (herein and commonly refered to as Mosts) suitable for performing logic functions described in connection with FIGS. *6a*, *6b*.

Figure 11:
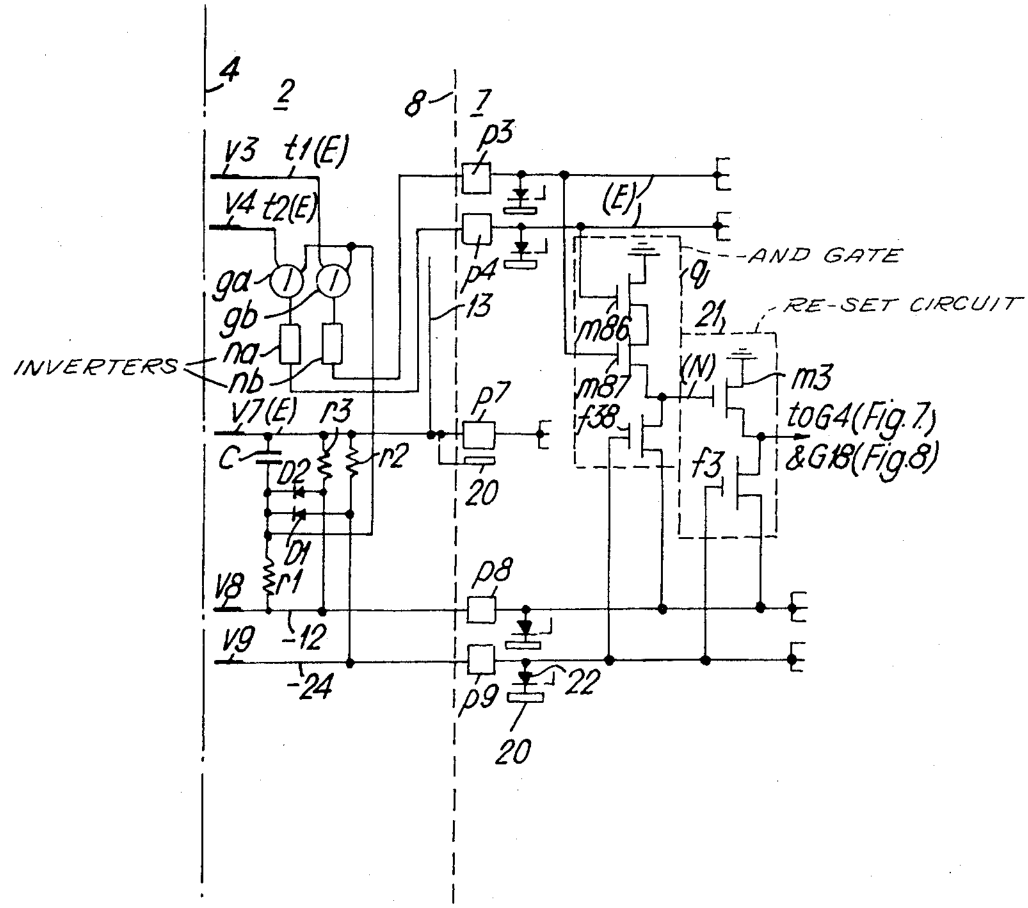

FIG. 11 shows an alternative to part of the circuitry of FIG. *6a*.

OUTLINE DESCRIPTION

At certain types of exchanges, e.g. those employing crosspoint switches, it is customary when a subscriber is given service on the exchange, firstly to connect the subscriber to a line equipment, and secondly to allocate the subscriber a directory number. Both the line equipment and the directory number are for the exclusive use of the subscriber. Thus in FIG. 1, three subscriber's lines *s*1, *s*2, *s*3 are connected by jumpers *j*1, *j*2, *j*3 to line equipments *l*1, *l*2, *l*3. The jumpers are generally provided at the main distribution frame of the exchange. The exchange also has a pair of uni-directional signal highways HI, HO, both capable of carrying complex signals, time pulse busbars T and power supply busbars Z. This equipment, being known, is shown above the chain line 1.

Signal conversion apparatus according to the invention is shown below the chain line 1, and has an input terminal and an output terminal corresponding and connected to each subscriber's line equipment. Typically input terminal i1 and output terminal *o*1 are connected to subscriber's line equipment *l*1, input terminal *i*2 and output terminal *o*2 to line equipment *l*2, input terminal *i*3 and output terminal *o*3 to line equipment *l*3 and so on. The apparatus also has a set of power supply terminals connected to the power supply bus bars Z, a set of time pulse terminals *tt* connected to the time pulse bus bars T, a set of terminals *ho* connected to the signal highway HO, and a set of terminals *hi* connected to the signal highway HI. A terminal *y* is provided at which an assistance signal is delivered, if desired, for use in the exchange.

The signal conversion apparatus has an adjustable signal converter SC1, SC2 – corresponding to each subscriber's line equipment *l*1, *l*2–. Typically, the signal converter SC1 includes a jack-in card 2 and adjustment means 3. The cards 2 are the same for all signal converters. The edges of the card 2 are represented by a chain line 4. By means of co-operating terminals such as 5, 6, jack-in connection is establishable between the signal converter SC1 and terminals of the apparatus. When jacked-in in its service position, individual connections are established between the signal converter SC1 and the input terminal *i*1 and the output terminal *o*1, these terminals being connected to the line equipment l1 to which the converter SC1 corresponds. The signal converter SC1 is not connected to any other input or output terminal. Multiple connections common to all the signal converters SC1, SC2– are established to the sets of terminals *ho*, *hi*, *tt*, and to the terminals *y*, *za*, *zb*.

The card 2 carries circuitry for effecting signal conversion, which will be discussed in detail later. Preferably the circuits employ metal oxide silicon transistors (Mosts) so that integrated circuit chips may be used. An integrated circuit chip 7 has its boundaries denoted by a broken line 8. In accordance with custom, access to and from the chip circuits is by means of pads *p*. The card 2 carries a capacitor C and resistor *r*1, which are used when the card 2 is being jacked in, to set bistable devices in the chip circuitry to a preferred state. (This arrangement is discussed fully in application Ser. No. 155,545, filed June 22, 1971, and assigned to the assignee hereof, now abandoned.) The card 2 also carries adjustment means 3. By means of co-operating terminals such as 9, 10, 11, 12 jack-in connection is establishable between a lead 13 on the card 2 and a selected pad (or pads) on the chip 7. The lead 13 is connected (indirectly) to the earthed terminal *za*, and the adjustment means 3 enables the distribution of earth potential within the chip 7 to be adjusted as required. Adjustment to any desired distribution of earth potential is effected by jacking-in on to the card 2 an adjustment means 3 appropriate to the desired distribution. It is arranged, that the adjustment means 3 can be adjusted to represent any number in the subscriber's numbering range. The adjustment means 3 carried by any card 2 represents the directory number of the subscriber connected to the line equipment to which the card corresponds. In the present example, the signal converter SC1 corresponds to subscriber's line equipment *l*1, and the adjustment means 3 is adjusted to represent the directory number of the subscriber *s*1, whose line is connected to the line equipment *l*1 by the jumper *j*1. Similarly the adjustment means 3 carried by the signal converter SC2 are adjusted to represent the directory number of the subscriber *s*2 and so on.

OUTLINE OF OPERATION

When a subscriber, e.g. *s*1 is given service on the exchange, he is allocated a subscriber's line equipment, e.g. *l*1 and a directory number, both for his exclusive use. His line is connected by a jumper *j*1, preferably at the main distribution frame, to the line equipment *l*1. A card 2 then has its adjustment means 3 adjusted to represent the directory number allocated to the subscriber *s*1. The card 2 is then jacked into position so that individual connections are established between it and the input terminal *i*1 and the output terminal *o*1, both of which are connected to the line equipment *l*1. At the moment of jacking-in, the capacitor C and resistor *r*1 operate to set bistable devices in the circuitry of the chip 7 to a preferred state.

When, now, the subscriber *s*1 originates a call, a single pulse signal is developed in known manner by the line equipment *l*1. This signal is delivered to input terminal *i*1 and thence to signal converter SC1. The signal SC1 responds by generating, in dependence on the adjustment of the adjusting means 3, a complex signal representing the directory number allocated to the sumscriber *s*1. This complex signal is delivered at the set of terminals *ho*, whence it is distributed over the signal highway HO to such points in the exchange as may be required. When the subscriber *s*1 is wanted for an incoming call, a complex signal representing his directory number appears on the signal highway HI and is received at the set of terminals *hi*. The received complex signal is applied to all the signal converters, SC1, SC2 – and compared with the signal generated in dependence on the adjustment of the adjustment means 3. In one of the converters, in this case SC1, the received and generated signals are identical. The converter SC1 indicates this by developing a single pulse signal which is delivered at the output terminal *o*1. From the output terminal *o*1, the signal is applied to the line equipment *l*1, thereby identifying the line equipment of the wanted subscriber *s*1.

DETAILED DESCRIPTION

As a preliminary to the detailed description of an embodiment of the invention, it is necessary to consider the nature of the signals used. A single pulse signal is carried by a single conductor (ignoring an earth return) and is illustrated in FIG. 2. A complex signal may have many forms. A complex signal is carried by a highway comprising a plurality of conductors (again ignoring an earth return) and consists of a succession of signal elements. Each element comprises at least one pulse applied selectively to the conductors forming the highway. The complex signal shown in FIG. 3 has four elements, this number being chosen because it is assumed that the exchange at which signal conversion apparatus is to be provided has a four digit numbering range. The four digits may be represented by P, Q, R, S. There is one element of a complex signal for each digit of the numbering range. Digit values are represented by selecting the conductor or conductors which carry the pulse or pulses comprising a signal element. In forming the complex signal of FIG. 3, the highway is arranged to present five conductors *a*, *b*, *c*, *d*, *e*. A signal element comprises simultaneous pulses on two of these conductors, the two concerned in any element depending on the digit value to be represented by the element. The relationship between digital values and conductors used is shown in FIG. 5 which represents one of a number of possible two-out-of-five code relationships. Thus the particular complex signal shown in FIG. 3 represents the subscriber's number 2840, in which P=2, Q=8, R=4, S=0. As shown in FIG. 4, time pulses $t1$ – $t4$ coincide with the signal elements P, Q, R, S respectively. These time pulses recur in a repetitive cycle, one cycle only being shown in FIG. 4. The single pulse signal shown in FIG. 2 has a duration exceeding the cycle time of the time pulses $t1$ – $t4$. This is desirable in the case of single pulse signals applied to the input terminals *i*1, *i*2–. If single pulse input signals of shorter duration than the time pulse cycle time are to be used, a staticiser will be necessary in order to derive a pulse signal of the requisite length.

Figure 1:
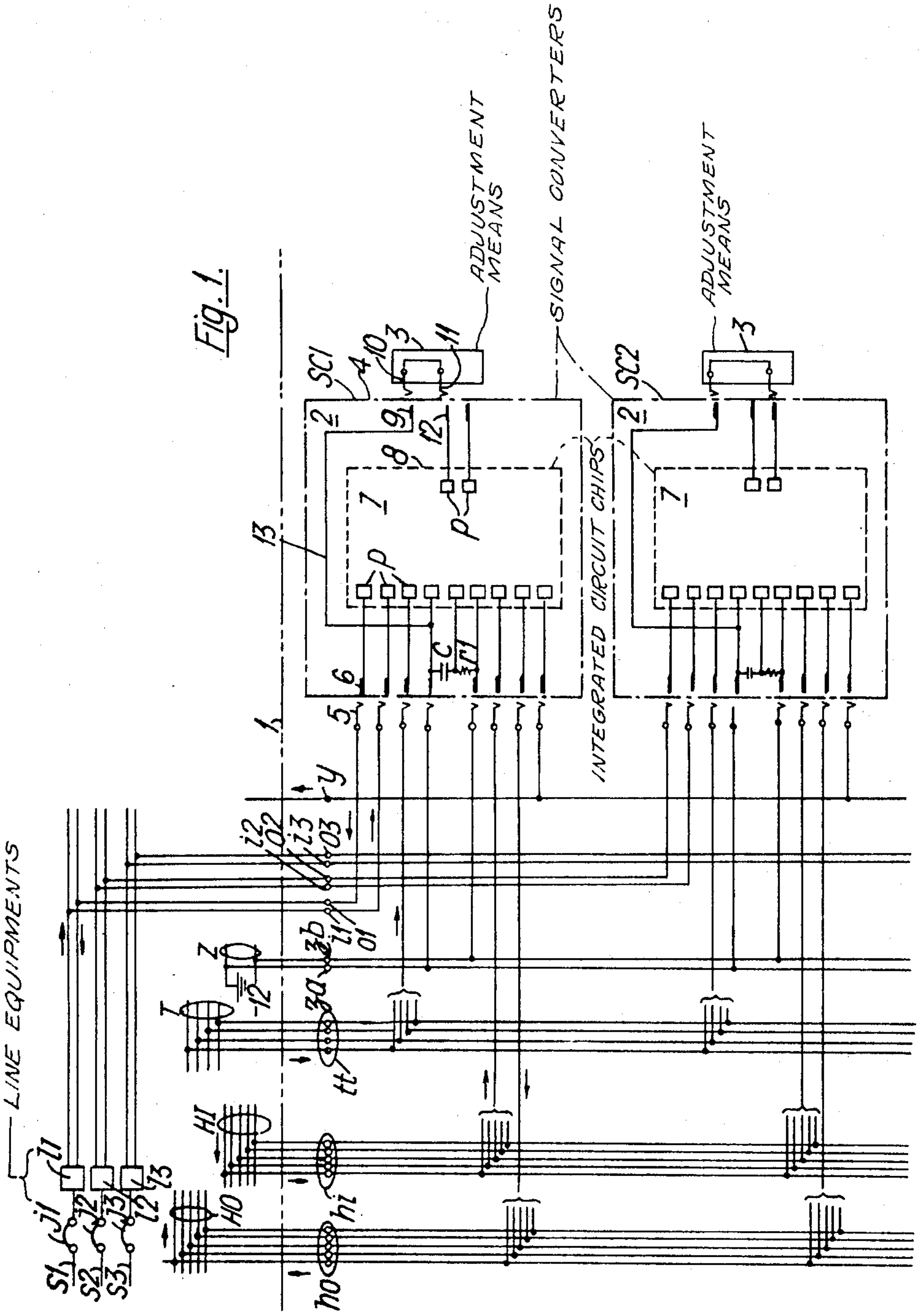
FIG. 1 is a schematic drawing of signal conversion apparatus according to the invention employed in the context just mentioned, known exchange equipment being shown above the chain line.
Figure 6A:
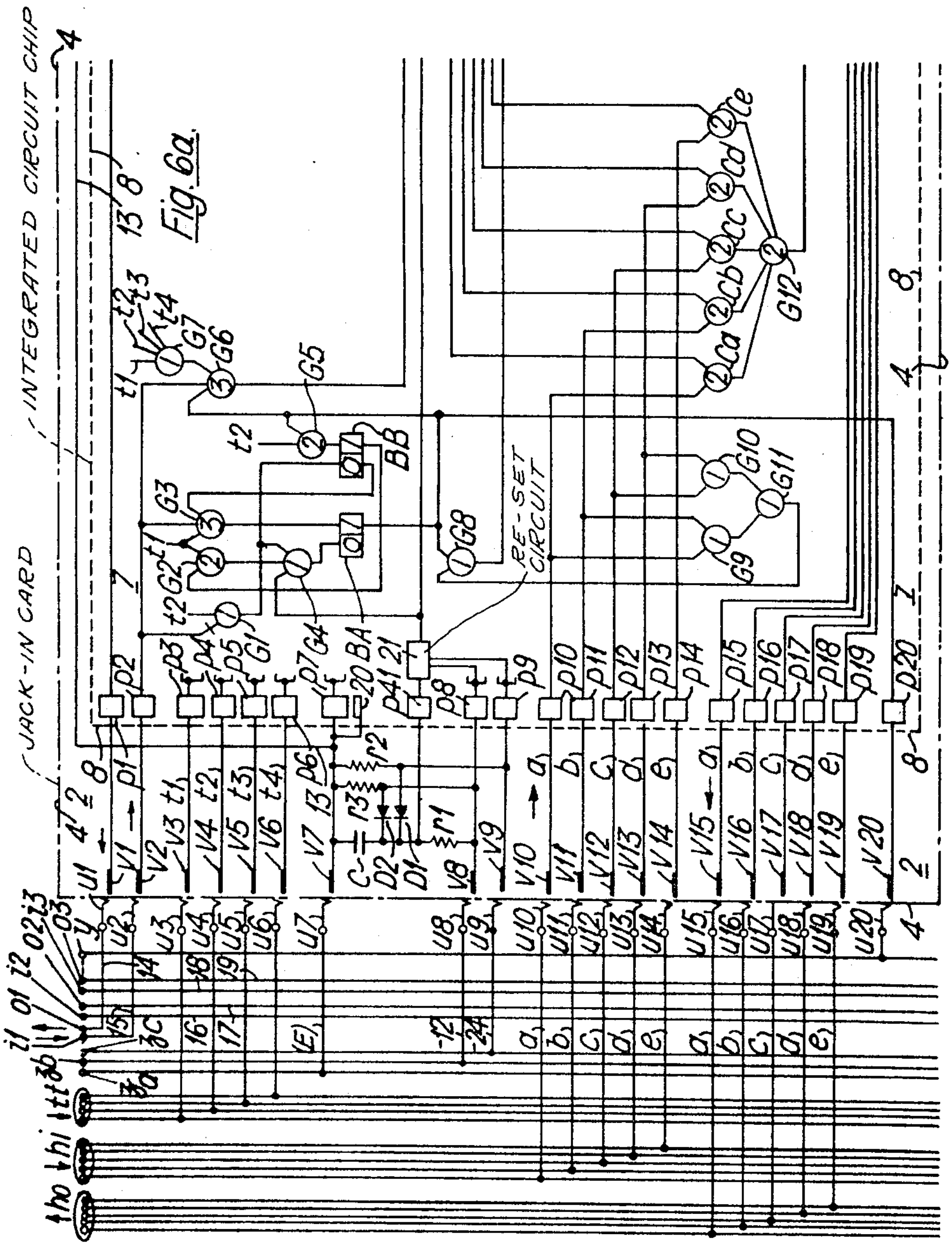
Figure 6B:
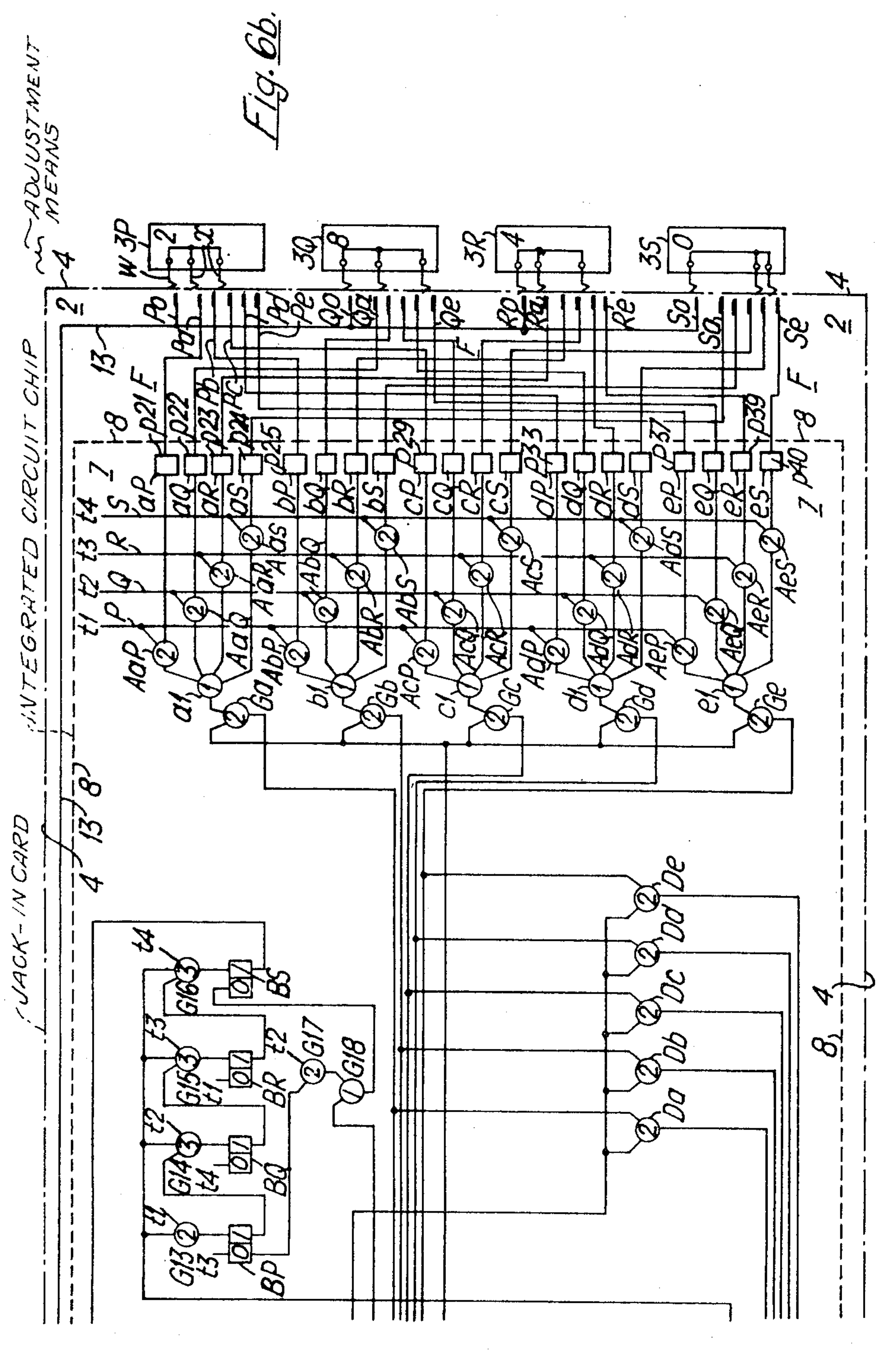

In the signal conversion apparatus shown in FIGS. 6*a*, 6*b*, a set of terminals *ho* and a set of terminals *hi* both comprise five terminals *a, b, c, d, e*, i.e. one terminal for each conductor of a highway suitable for the complex signal of FIG. 3. These sets of terminals are connected respectively to uni-directional signal highways HO, HI in the exchange as shown in FIG. 1. A set of terminals *tt* comprises four terminals, one terminal for each of the time pulses *t*1, *t*2, *t*3, *t*4 of FIG. 4. Three terminals *za, zb zc* connected to sources of convenient potentials, for example earth, −12 volts and −24 volts respectively. Input terminals *i*1, *i*2, *i*3 and output terminals *o*1, *o*2, *o*3 are provided for each subscriber's line equipment *L*1, *L*2, *L*3, one input terminal and one output terminal being connected to each subscriber's line equipment. As shown in FIG. 1, input terminal *i*1 and output terminal *o*1 are connected to each subscriber's line equipment *L*1, and so on. If desired, a terminal *y* may be provided at which an assistance signal is delivered when a single pulse signal is converted into a complex signal. The assistance signal is passed to the exchange for use in any desired manner, for example to cause the generation of a further signal indicating the method of signalling (e.g. Strowger, multifrequency etc.) used by the subscriber whose number is represented by the complex signal. The signal conversion apparatus includes a signal converter comprising a jack-in card corresponding to each subscriber's line equipment. The apparatus, therefore, has as many jack-in positions as there are subscriber's line equipments. One of these positions, comprising 20 terminals u1 − *u*20, is shown in FIG. 6*a*. The particular jack-in position shown in FIG. 6*a* is the position corresponding to subscriber's line equipment *l*1. This is apparent from the individual connections 14, 15 which connect respectively the terminals *u*1, *u*2 of the jack-in position with the output terminal *o*1 and the input terminal *i*1 of the apparatus. As shown in FIG. 1, the output terminal *o*1 and input terminal *i*1 are connected to subscriber's line equipment *l*1. The remaining terminals *u*3–*u*20 of the jack-in position are connected as follows:

*u*3– *u*6 to terminals *t*1 – *t*4 respectively of the set of terminals *tt* to convey time pulses *t*1–*t*4 from the exchange to the jacked-in cards;

*u*7 – *u*9 to the terminals *za, zb, zc* to supply jacked-in cards with earth, −12 volts, and −24 volts potential respectively;

*u*10 – *u*14 to the *a, b, c, d, e* terminals respectively of the set of terminals *hi*;

*u*15 – *u*19 to the *a, b, c, d, e* terminals respectively of the set of terminals *ho;*

*u*20 to the terminal *y*.

The connections from the terminals *u*3 – *u*20 are the same for all the jack-in positions, and are effected by multiple wiring in the well known way. The connections from the terminals *u*1, *u*2 are individual to each position, and are taken to the output and input terminals which are connected to the relevant subscriber's line equipment. Thus connections 14, 15 serve the jack-in position corresponding to subscriber's line equipment *l*1 as already mentioned. Conductors 16, 17 serve the jack-in position corresponding to line equipment *l*2, conductors 18, 19 serve the jack-in position corresponding to line equipment *l*3, and so on.

A signal converter comprises a jack-in card and appropriately adjusted adjustment means. The jack-in cards are the same for all signal converters. The jack-in card will be described first, and the adjustment means will be considered later. Both in FIG. 1 and in FIGS. 6*a*, 6*b*, a jack-in card is shown by the reference 2, its edges being shown by a chain line 4. The card 2 has twenty terminals *v*1 – *v*20 capable of establishing jack-in connections with the terminals *u*1 – *u*20. The card 2 carries circuitry for effecting signal conversion. As this circuitry may be realised from any suitable components, it is depicted in FIGS. 6*a*, 6*b* by logic symbols. But as the use of metal oxide silicon transistors (herein and commonly referred to as Mosts) is preferred, the circuitry is presented as being accommodated on an integrated circuit chip. This chip is referenced 7 in FIG. 1 and FIGS. 6*a*, 6*b*, the chip boundaries being indicated by a broken line 8. The chip 7 is suitably mounted on the card 2. The chip 7 has pads *p* giving access to and from the chip circuitry. Twenty of these pads referenced *p*1 – *p*20, correspond and are directly connected to the terminals *v*1 – *v*20. A capacitor C is connected in series with a resistor *r*1 between terminals *v*7, *v*8. The capacitor C is shunted by a diode D1 in series with a resistor *r*2, and by a diode D2 in series with a resistor *r*3. The resistor *r*2 is connected between terminals *v*7, *v*9; and resistor *r*3 between terminals *v*7, *v*8. The junction of the capacitor C and resistor *r*1 is connected to a pad *p*41. As explained in application Ser. No. 155,545 filed June 22, 1971, and assigned to the assignee hereof this arrangement enables a signal to be delivered to the pad *p*41 while the card 2 is being jacked into position, which signal sets bistable devices in the chip circuitry to a preferred state. The diodes D1, D2 make delivery of this signal independent of contact bounce. It is often important to keep to a minimum the number of pads *p* used on an integrated circuit chip. A circuit variation, which enables the pad *p*41 to be dispensed with, is considered in connection with FIG. 11. The terminal *v*7 is connected to the chip substrate 20, so that the substrate is held at earth potential after the card 2 has been jacked into position. A lead 13, carried on the card 2 is run from terminal *v*7 to cater for the adjustment means, which will now be considered.

The adjustement means enable a card 2 to be adjusted to any particular complex signal that may be required. The adjustment means provides for individual adjustment in respect of each element of the complex signal, the adjustment comprising the selection of an appropriate combination of the conductors of a highway that carries the complex signal. The adjustment means shown in FIG. 6*b* cater for a complex signal of four elements P, Q, R, S, each element comprising simultaneous pulses on two conductors selected from five conductors *a, b, c, d, e* which form a highway. The adjustment means shown in FIG. 6*b* are adjusted to the complex signal shown in FIG. 3, i.e. to the subscriber's number 2840, the adjustment being effected in accordance with the code of FIG. 5. The adjustment means comprise four plugs 3P, 3Q, 3R, 3S, one in respect of each element of the complex signal, or in other words, one plug in respect of each digit of the subscriber's number. There are ten varieties of plugs, one for each of the ten decimal values 0–9, the relevant decimal value being exhibited on each plug. To adjust to the number 2840, a value 2 plug is selected in respect of the P digit, a value 8 plug in respect of the Q digit, a value 4 plug in respect of the R digit, and a value O plug in respect of the S digit.

The plugs 3P, 3Q, 3R, 3S are received by the card 2 on a jack-in basis. The plugs are received at a part of the edge 4 of the card 2 which is clear of the terminals *v*1 – *v*20 (FIG. 6*a*). A group of six terminals is provided for each plug. Five of these terminals correspond to the five conductors *a, b, c, d, e* of a highway for the complex signal. The sixth represents a source of earth potential. The six terminals in respect of the P digit are referenced P*a*, P*b*, P*c*, P*d*, P*e* and P*o*. Terminals for the Q, R, S digits are correspondingly referenced. The lead 13 is connected to terminals P*o*, Q*o*, R*o*, S*o* and serves to supply earth potential to these terminals (via terminals *u*7, *v*7) when the card 2 is jacked-in at its working position. The terminals P*a* – P*e*, Q*a* – Q*e*, R*a* – R*e*, S*a* – S*e* are connected to pads *p*21 – *p*40 of the chip 7 in a manner that will be discussed later. Each plug has a terminal *w*, and two terminals *x* conductively connected to the terminal *w*. When a plug is jacked-in on the card 2, the terminal *w* establishes contact with the terminal P*o*, Q*o*, R*o*, S*o* as appropriate. The terminals *x* of a plug are spaced from the terminal *w* by distances such as ensure contact with two of the contacts *a, b, c, d, e* as determined by the digit value exhibited on the plug and the code of FIG. 5. Thus, with the adjustment means adjusted to the number 2840 (as shown in FIGS. 6*a*, 6*b*) earth potential from lead 13 is supplied:

via terminal P*o* to terminals P*a*, P*c*;
via terminal Q*o* to terminals Q*b*, Q*e*;
via terninal R*o* to terminals R*a*, R*d*;
via terminal S*o* to terminals S*d*, S*e*;

and to these terminals only.

The pads *p*21 – *p*40 of the chip 7 are arranged in five sets, one set for each of the conductors *a, b, c, d, e* of a highway for a complex signal. Each set consists of four pads, corresponding respectively to the four elements P, Q, R, S of a complex signal. Thus the set of pads *p*21 – *p*24 relates to the conductor *a* of the highway, individual pads *p*21 – *p*24 relating to the P, Q, R, S elements of the complex signal respectively. This relationship is shown by the references *a*P, *a*Q, *a*R, *a*S placed against the pads *p*21 –*p*24. The remaining pads *p*25– *p*40 are similarly referenced in relation to the *b, c, d, e* conductors. As has been seen, the terminals for receiving the adjustment means are arranged in four groups, one group for each digit or signal element P, Q, R, S. Within each group, there are five terminals *a, b, c, d, e* corresponding to the five conductors of the highway. Thus the group of terminals P*a*– P*e* relate to the conductors used for the P digit or P signal element; the group of termi als Q*a* – Q*e* to the conductor used for the Q digit or Q signal element and so on. The four groups of five terminals are connected to the five sets of four pads by a connection field F. The connection field F comprises jumpers of insulated wire permanently connecting the terminals to the appropriate pads. For example, terminals P*a* – P*e* are cconnected respectively to pads *p*21 (*a*P), *p*25(*b*P), *p*29(*c*P), *p*33(*d*P), *p*37 (*e*P); the terminals Qa – Qe are connected reespectively to pads *p*22 (*a*Q), *p*26 (*b*Q), *p*30 (*c*Q), *p*34 (*d*Q), *p*38(*e*Q); and so on.

In the chip 7, an array of adjustment gates is provided For each conductor *a, b, c, d, e* of the highway there is an adjustment gate corresponding to each signal element P, Q, R, S. In respect of each conductor, each adjustment gate is connected to the pad relating to the signal element to which the gate relates, and earth potential appearing at a pad serves to mark the gate concerned. The adjustment gates are strobed by the time pulses *t*1 – *t*4 appropriate to the signal element concerned. More specifically, in respect of conductor *a*, four adjustment gates A*a*P, A*a*Q, A*a*R, A*a*S are provided one corresponding to each element P, Q, R, S of a complex signal. These gates are connected respectively to pads *p*21 (*a*P), *p*22(*a*Q , *p*23(*a*R), *p*24(*a*S). Earth potential appearing at one of these pads marks the gate connected to the pad. The outlets of the four gates are taken to an OR gate *a*1, and thence to a two input AND gate G*a*. Similar arrangements are made for the other conductors *b* – *e*, the gates being appropriately referenced. Adjustment gates relating to the same signal element are strobed by the time pulse appropriate to the element. For example, the adjustment gates A*a*P, A*b*P, A*c*P, A*d*P, A*e*P, which all relate to the signal element P, are all strobed by the time pulse *t*1.

The outlets from the gates G*a*– G*e* are taken to delivery gates D*a* – D*e* and to correspondence gates C*a* – C*e*. The outlets of the delivery gates D*a* –D*e* are taken to pads p15 - p19 whence connection exists (when the card 2 is jacked-in at its working position) to the apparatus terminals *ho*. The delivery gates D*a* – D*e* also have the output of a gate G6 applied to them, the application being strobed by means of a gate G7. When a single pulse signal is received at the pad *p*2, gate G3 is primed, and opens at time *t*1 to operate a bistable device BA, priming gates G5, G6. At time *t*2, a bistable device BB is operated, priming gate G2 to ensure that the bistable device a is restored at the next time pulse *t*1. While the bistable device BA is operated, gate G6 opens repeatedly in response to strobing by gate G7: also, gate G8 is opened, its output being used to enable the gates G*a* – G*e*. With the card 2 jacked-in at the position shown in FIG. 6*a*, the single pulse signal received at pad *p*2 was received by the apparatus at input terminal *i*1.

The correspondence gates C*a* – C*e* are connected to the pads *p*10 – *p*14, which (when the card 2 is jacked-in at its working position) are connected to the apparatus terminals hi. By means of three two-input OR gates G9, G10, G11, the gate G8 is caused to open whenever an element of a complex signal is received at pads *p*O – *p*14. The pads *p*10 – *p*4, representing respectively the *a* –*e* conductors of the highway, are connected to the appropriate one of five correspondence gates C*a* – C*e*. As shown in FIG. 6*a*, these are two-input AND gates to which the respective outputs of the gates G*a* – G*e* are also applied. If, when a pulse of a received signal element is applied to a correspondence gate, an output is also delivered to the correspondence gate from the appropriate one of the gates G*a* – G*e*, the correspondence gate opens. For instance, if a pulse of a received element is applied to correspondence gate C*a*, and at the same time an output is delivered by the gate G*a*, the correspondence gate C*a* opens. By means of gate G12, a correspondence signal is delivered whenever two of the correspondence gates $Ca - Ce$ are open, delivery being made to a stepping train comprising four bistable devices BP, BQ, BR, BS. The stepping train steps once for each correspondence signal, the time pulses $t1 - t4$ being employed so that only one of the four bistable devices is operated at any one time. If two of the correspondence gates $Ca - Ce$ open in respect of each element of a complex signal, the stepping train steps until the bistable device BS operates. With the bistable device BS operated, s single pulse signal is applied to the pad $p1$, and thence (if the card 2 is jacked-in at its working position) to the output terminal $o1$.

The working of the correspondence gates $Ca - Ce$ and of the gate G12 has been described here in logical terms for ease of explanation. As will be seen later from the description relating to FIGS. 9, 10, the electrical gating arrangement adopted, while giving the desired logical results, may not correspond directly in detail with the logical gating arrangement just described.

DETAILS OF OPERATION

Adjustment: When the subscriber S1 (FIG. 1) is first given service on the exchange, a jumper $j1$ is run to connect his line to the line equipment $l1$. The line equipment $l1$ is already connected to the input terminal $i1$ and output terminal $o1$ of the signal conversion apparatus. At the same time, a number - in this case 2840 — is allocated to the subscriber. A card 2 is now withdrawn from stock and adjusted to the number 2840. Adjustment is effected by jacking-in on to the card 2 a 2-value plug in respect of the P digit, an 8-value plug in respect of the Q digit, a 4-value plug in respect of the R digit, and an O-value plug in respect of the S digit, (FIG. 6b) so establishing connections between the lead 13 and selected adjustment gates by means of which the selected gates are marked.

Jacking-In: The adjusted card must now be jacked-in at its correct working position in the apparatus. The position required in the present case is that at which the terminals $u1$, $u2$ (FIG. 6a) are connected to the output terminal $o1$ and input terminal $i1$ of the apparatus. When jacked-in at this position, the adjusted card 2 becomes the signal converter SC1 of FIG. 1.

Prior to jacking-in, the terminals on the card 2, the pads of the chip 7, and other parts of the electric circuits stand at an indeterminate potential or potentials. As soon as the card has been jacked-in, earth potential appears at terminal $v7$ −12 volts at terminal $v8$, and −24 volts at terminal $v9$ (FIG. 6a). These potentials are applied to the pads $p7$, $p8$, $p9$ and thence to the circuitry of the chip 7. Additionally, earth potential is applied to the chip substrate 20; and, by lead 13 and the plugs 3P, 3Q, 3R, 3S (FIG. 6b), to adjustment gates $AaP$, $AaR$, $AbQ$, $AcP$, $AdR$, $AdS$, $AeQ$, $AeS$ where it serves as a marking signal. Again, as soon as the card has been jacked-in, time pulses $t1 - t4$ are received from the exchange at terminals $u3 - u6$ respectively, being applied thence by pads $p3 - p6$ to the chip circuitry. The time pulses are received as a recurrent cycle. As described more full in application Ser. No. 155,545, filed June 22, 1971, and assigned to the assignee, thereof, a re-set circuit 21 (FIG. 6a) is switched on by the apperance of −12 volts potential, delivering a re-set signal to gates G4, G18. The re-set signal is maintained until the re-set circuit 21 is switched off on account of the pad p41 assuming a critical potential due to the charging of the capacitor C. It is arranged for the capacitor C to charge at a rate which allows the re-set signal to be maintained long enough for all the devices concerned to respond to the re-set signal. With gate G4 open, the bistable device BA is set to the "0" state. The next time pulse $t2$ opens the gate G1 and is ineffective at gate G5. The bistable device BB is set to the "0" state. If a signal is being received at the pad $p2$ at the instant the card is jacked-in, the gate G1 will be inhibited. To ensure that the bistable device BB is set to the "0" state under these conditions, it is arranged that the duration of the re-set signal exceeds that of any signal received at the pad $p2$. Of the four bistable devices of the stepping train, device BP is set to the "0" state by time pulse $t3$, device BQ by pulse $t4$, and device BR by pulse $t1$, and device BS by the output of gate G18. All the bistable devices are now in the "00" state. The re-set signal is now terminated.

Idling

When a signal converter is in service and awaiting use, all the bistable devices BA, BB, BP, BQ, BR, BS are in the "0" state, and the time pulses $t1 - t4$ are received recurrently at pads $p3 - p6$. No other signals are received by the converter i.e. by the card 2. During each time cycle the primed gates in the array of adjustment gates $AaP - AaS$ are opened, but their outputs are suppressed at the gates $Ga - Ge$ in the absence of an enabling output from gate G8. As regards the bistable devices BA, BB, time pulse $t2$ opens gate G1 ineffectively. The output of gate G7 is suppressed at gate G6. In the stepping train, time pulses $t1$, $t3$, $t4$ are applied ineffectively to bistable devices BR, BP, BQ respectively. This pulse $t2$ opens gates G17, G18, but this too is ineffective.

Conversion: single to complex

Suppose now the subscriber s1 (FIG. 1) originates a call and that it is desired to know the number of the calling line. The calling condition of the subscriber's line $s1$ is detected by the subscriber's line equipment $l1$ in the well known way, a single pulse signal being generated under these conditions. The single pulse signal is applied to the input terminal $i1$ (FIGS. 1 and 6a) and thence to the pad $p2$ (FIG. 6a). The signal inhibits gate G1. The following $t1$ pulse opens gate G3 and operates the bistable device BA, opening gate G8, priming the gates G5, G6 and delivering a signal at pad $p20$ which is applied thence as an assistance signal to the terminal $y$. As already mentioned, the assistance signal is used in the exchange as may be required, e.g. to indicate the method of signalling used by the calling subscriber. With gate G8 open, gates $Ga - Ge$ pass the outputs of the primed adjustment gates to the delivery gates $Da - D\,e$. The outputs also reach the correspondence gates $Ca - Ce$, but are ineffective in the absence of a complex signal on the highway HI. The primed gate G6 opens on dependence on the strobing of gate G7 and enables the delivery gates $Da - De$ in synchronism with the outputs of the gates $Ga - Ge$. Hence at time pulse $t1$, the primed adjustment gates $AaP$, $AcP$ are opened, followed by gates $a1$, $c1$; $Ga$, $Gc$; $Da$, $Dc$. This causes pulses to be applied to pads $p15$, $p17$, which are delivered thence by the $a$ and $c$ conductors of a group of delivery conductors to the $a$ and $c$ terminals of the set of terminals $ho$. In other words, at time pulse $t1$, the first signal element of the complex signal to which the signal converter SC1 (card 2) is adjusted — i.e. the digit 2 of the number 2840 — is delivered at the set of terminals $ho$, and thence to the signal highway HO in the exchange. The second, third and fourth elements follow similarly at time pulses $t2$, $t3$, $t$ 4. Additionally the pulse $t2$ opens gate G5 and operates the bistable device BB, priming gate G2 and disabling gate G3. At the next $t1$ pulse, therefore, gate G2 opens followed by gate G4, restoring the bistable device BA. Thus the bistable device BB ensures that the bistable device BA is operated for exactly one time cycle at each operation. With the device BA restored, the gates $Ga - Ge$ are closed, the assistance signal at terminal $y$ is terminated, and gates G5, G6 are disabled. The first $t2$ pulse after the termination of the pulse signal received at the pad $p2$, causes the gate G1 to open, thereby restoring the bistable device BB.

Conversion: complex to single

Now suppose that the subscriber $s1$ (FIG. 1) is wanted for a call incoming to his line. His number, 2840, has been received at the exchange, and it is desired to identify the subscriber's line equipment to which his line is connected, i.e. the line equipment $l1$. To start the identification process, the complex signal (FIG. 3) representing the wanted number is applied to the signal highway HI (FIG. 1). The complex signal is received by the signal conversion apparatus at the set of terminals hi (FIGS. 1 and 6*a*). From these terminals, the received signal is applied over a receive group of conductors to all the signal converters SC, SC2... simultaneously. All the converters respond simultaneously, but their response differs in certain respects as will become clear from the following description. The complex signal is received at pads $p$ 10 – $p14$, the signal elements being delivered by the exchange in synchronism with the time pulses $t1$ – $t4$. As each element is received, one or other of the gates G9, G10 opens, followed by gates G11, G8, the latter enabling the gates $Ga - Ge$. A received element is also applied to the correspondence gates $Ca - Ce$. As each element consists of two pulses, an input signal is applied to each of two correspondence gates. If either of these gates receives an output from that one of the gates $Ga - Ge$ to which it is connected, the correspondence gate opens. If both correspondence gates open, gate G12 also opens, and delivers a correspondence signal indicating correspondence between the received signal element and the element read from the marked adjustment gates. A correspondence signal causes the stepping train of bistable devices BP, BQ, BR, BS to step once. The stepping action comprises the switching of one of the devices from the "0" to the "1" state.

Now the complex signal received at the terminals hi is the complex signal shown in FIG. 3, representing the number 2840. At the time $t1$, pulses are received at the $a$ and $c$ terminals of the set $hi$ and are passed to pads $p10$, $p12$ of all the signal converters SC1, SC2–. In each converter the pulses are applied to the correspondence gates $Ca$ and $Cc$. In those converters having the P digit adjusted to the value 2, the gates $Ga$ and $Gc$ deliver outputs at time $t1$. In these converters, but in no others, the correspondence gates $Ca$ and Cc open, followed by gate G12 which delivers a correspondence signal. The correspondence signal operates the bistable devices BP. At the time $t2$, correspondence gates $Cb$ and $Ce$ open in those signal converters having the Q digit adjusted to the value 8, causing a correspondence signal to be generated. At those converters where the bistable device BP is operated, the correspondence signal operates the bistable device BQ. At time $t3$, the bistable device BR is operated in those signal converters whose P, Q, R digits are adjusted to 2, 8, 4 respectively. The bistable device BP is restored at time $t3$ in those converters where it has been operated. At time $t4$ a correspondence signal in respect of the value 0 is generated in the signal converter SC1 only. In this converter, and in no other, the bistable device BS is operated at time $t4$. At time $t4$ the bistable device BQ is restored in those converters where it has been operated. In the converter SC1, the output of the operated device BS is applied to the pad p1, and thence to the apparatus output terminal $o1$ and the subscriber's line equipment $l1$, as a single pulse signal which may be employed in any desired way. During the next time cycle, the time pulse $t1$ restores the bistable device BR. The bistable device BP having been restored at time $t3$ of the preceding cycle, time pulse $t2$ opens gate G17, causing the bistable device BS to restore and so terminate the signal applied to the pad $p1$. Time pulses $t3$, $t4$ are ineffective.

Change of Number

If the number allocated to the subscriber $s1$ is changed, the adjustment plugs appropriate to the old number are withdrawn from the signal converter SC1, and are replaced by plugs appropriate to the new number.

MOST circuits

Circuits employing metal oxide silicon transistors (Mosts) which perform the logic functions just discussed, will now be described with reference to FIGS. 7–10. These circuits are suitable for manufacture by integrated circuit techniques. Electrical connection to the circuits is effected by means of pads p. Those pads which are connected to the gate of a Most are provided with gate protection diodes 22 which are connected between the pad and the chip substrate 20. In FIGS. 7–10, the letters E and N in brackets are used to indicate earth and negative potential respectively. They represent the potentials existing at points in the circuitry when a card has been jacked in at its working position and when no signals are present - in other words, the conditions considered above under the heading Idling. Broken lines are used to indicate which Mosts correspond to the logic units, e.g. gates, bistable devices, of FIG. 6*a*, 6*b*, the references used in FIGS. 6*a*, 6*b* being used again in FIGS. 7–10. Mosts which are used for their switching function are referenced $m$, those used as inverters are referenced $k$, and those used as impedances are referenced $f$, serial numbers being added in each case. In general, the working of the circuits will be apparent from the description of the logic functions given above, coupled with an examination of the polarities used.

Figure 7:
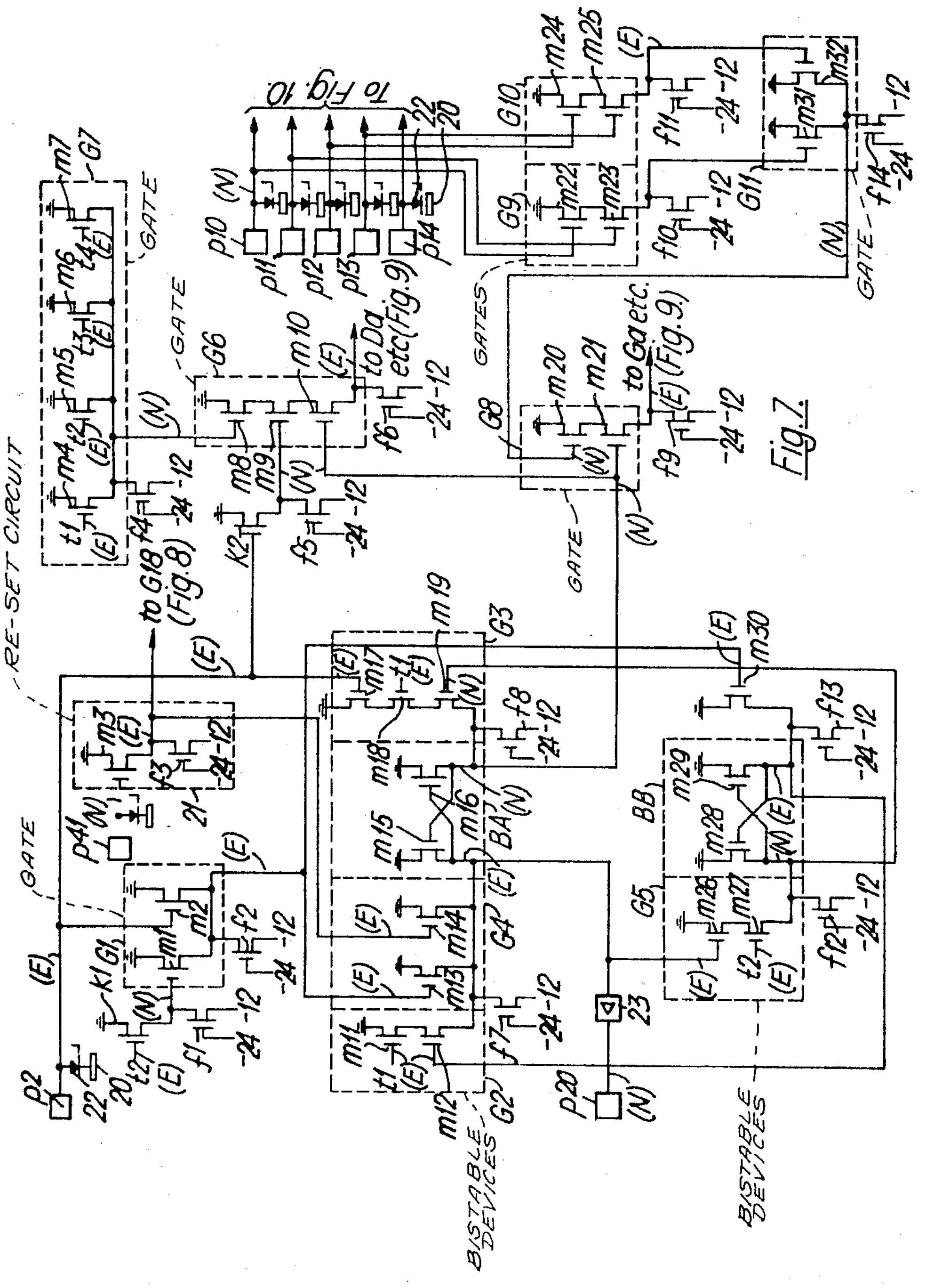

Thus in FIG. 7 the bistable devices BA, BB comprise pairs of cross-connected Mosts $m15$, $m16$; $m28$, $m29$. As considered more fully in the specification already mentioned, the re-set circuit 21 includes a Most $m3$. At the instant of jacking-in, negative potential is applied over Most $f3$ to the gate of Most $m14$ in the OR gate G4, causing Most $m$ 4 to conduct, and apply earth potential to the gate of Most $m$ 6 in the bistable device BA. With its gate at earth potential, Most $m16$ cannot conduct, with the result that negative potential appears at the gate of Most $m15$, which consequently conducts. The capacitor C (FIG. 6*a*) then charges, causing Most $m3$ to conduct and to apply earth potential to the gate of Most $m13$. The bistable device is now set to its "0" state with Most $m15$ conducting, and is free to respond to signals applied to it. The setting of bistable device BB follows as previously described. The inhibiting action of time pulse *t2* on gate G1 is obtained by inverting the polarity at an inverter *k*1. Another inverter *k*2 is used to invert the polarity of a received signal pulse before application to the gate G6. It is convenient to consider the remainder of FIG. 7 and FIG. 8 later in connection with FIG. 10.

Figure 9:
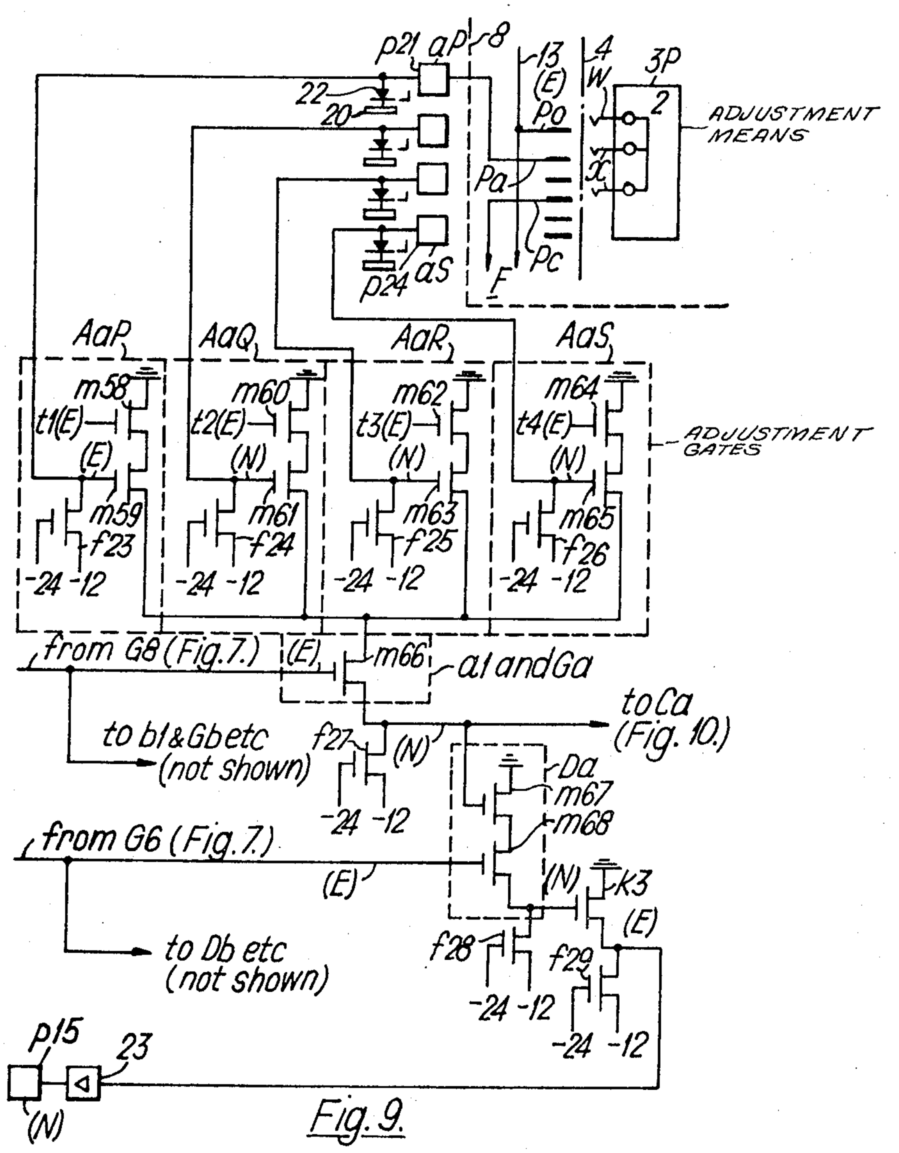

Adjustment gates for conductor *a* of the highway for a complex signal are shown in FIG. 9. The arrangements in respect of the other conductors *b, c, d, e* are similar, and are not shown individually. In FIG. 9, an adjustment plug 3P, having a value 2, extends earth potential from lead 13 to terminals P*a*, P*c*. A jumper of the cross connection field F extends this potential to the pad p21. The pad *p*21 is connected to the gate of a Most *m*59. The Most *m*59 is in series with a Most *m*58, to the gate of which the time pulse *t*1 is applied. The Mosts *m*58, *m*59 therefore function as the adjustment gate A*a*P. Similarly, Mosts *m*60, *m*61; *m*62, *m*63; *m*64, *m*65 function as adjustment gates A*a*Q, A*a*R, A*a*S respectively. Earth potential applied via pad *p*21 to the gate of Most *m*59 serves to mark the adjustment gate A*a* P. When no earth potential is applied to a pad, the potential at the gate of the Most connected to the pad would be indeterminate, and the functioning of the Most would be unreliable. To prevent these conditions, Mosts *f*23 – *f*26 are connected to the gates of Mosts *m*59, *m*6 , *m*63, *m*65 respectively to serve as biasing impedances. In the absence of earth potential at the relevant pad, these impedances hold the gate potential at a negative value. For example, the gates of Mosts *m*61, *m*63, *m*65 are held negative by means of Mosts *f*24, *f*25,*f*26. Being strobed by the time pulses *t*1 – *t*4 the adjustment gates A*a*P, A*a*S are never used simultaneously. The drains of Mosts *m*59, *m*61, *m*65 are commoned, and connected by a Most *m*66 to a common impedance Most *f*27. The gate of Most *m*66 is connected to the outlet of gate G8 (FIGS. 6 *a*, 7). The Most *m*66 therefore combines the functioning of gates *a*1 and G*a*. (FIG. 6*b*).

The drain of Most *m*66 is connected to the gate of a Most *m*67 which is in series with a Most *m*68. The gate of Most *m*68 is connected to the outlet of gate G6 (FIGS. 6*a*, 7). The mosts *m*67, *m*68 therefore serve as the delivery gate D*a*. The outlet of the delivery gate D*a* is connected to an inverter comprising a Most *k*3. The outlet of the inverter is connected to an amplifier 23 and thence to pad *p*15.

The working of Mosts *m*58 – *m*68 will now be considered. In the absence of any signals, the polarities are as shown in FIGS. 7–10. Pads *p*10 – *p*14 and *p*15 – *p*19, at which complex signals are respectively received and delivered, stand at negative potential, Mosts *m*58, *m*60, *m*62, *m*64, *m*66, *m*68 are non-conductive and Most *m*59 is held non-conductive; Mosts *m*61, *m*63, *m*65 are held conductive, Most *m*67 also being conductive. The time pulses *t*1 – *t*4 are negative-going. Their application to the adjustment gates A*a*P – A*a*5 however is ineffective as long as Most *m*66 is non-conductive. When a single pulse signal is received for conversion into a complex signal, gates G6, G8 (FIGS. 6*a*, 7) open, switching Mosts *m*68, *m*66 respectively into the conductive state. Whether Most *m*66 actually conducts depends on whether the adjustment gates A *a*P – A*a*S open when they are strobed. With the adjustment shown in FIG. 9, application of the time pulse t1 to gate A*a*P is ineffective, because Most *m*59 is held non-conductive. But each of the time pulses *t2*, *t3*, *t4* causes Most m66 to conduct, changing its drain potential from negative to earth.

The working of the delivery gate D*a* will now be considered. The gate is enabled when the opening of gate G6 applies negative potential to the gate of Most *m*68. Gate D*a* will open unless Most *m*66 conducts and applies earth potential to the gate of Most *m*67. If negative potential appears at the gate of Most *m*68 before a change from negative to earth in the gate potential of Most *m*67, the gate D*a* will open and deliver a spurious output signal. To prevent this, the gate G7 is strobed by the output of gate G6 (FIGS. 6*a*, 7) so that changes in the gate potentials of Mosts *m*67, *m*68 occur simultaneously. The output from gate D*a* is inverted by Most *k*3, amplified by an amplifier 23 and delivered at pad *p*15.

Summarising the foregoing: with gates G6, G8 both open, time pulse *t*1 fails to open the adjustment gate A*a*P on account of the earth potential at the gate of Most *m*59. Most *m*66, though conductive, does not conduct. The gate potential of Most *m*67 therefore remains negative. Most *m*67, *m*68 both conduct, causing the drain of the latter to assume earth potential, which potential is applied to the pad *p*15. This potential represents the first pulse on conductor *a* in the complex signal of FIG. 3. The adjustment gate A*a*Q opens on the application of time pulse *t*2, causing Most *m*66 to conduct and apply earth potential to the gate of Most *m*67. The delivery gate D*a* therefore does not open, and the pad *p*15 stands at negative potential. With the adjustment shown in FIG. 6*b* however, the gate A*a*R would be marked (as described under the heading Jacking-in) by earth potential at the gate of Most *m*63 (FIG. 9). In this event, the time pulse *t*3 would act similarly to time pulse *t*1.

The circuitry just described relates to conductor a of the highway, and controls the potential appearing at the pad p15. Identical circuitry is provided in respect of each of the other conductors *b, c, d, e* of the highway to control the potentials at pads *p*16 – *p*19 respectively. Thus, with the adjustment shown in FIG. 9, the circuitry relative to the *c* conductor responds to the time pulse *t*1 in the same way as the circuitry relating to the *a* conductor, because the adjustment gate A*c* P is marked. Hence an earth pulse is delivered at pad *p*17 in respect of this *c* conductor simultaneously with the earth pulse delivered at pad *p*15 in respect of the *a* conductor. The circuitry relating to each of the *b, d, e* conductors responds to the time pulse *t*1 in the manner that the circuitry relating to the *a* conductor responds to the time pulse *t2*. Hence the pads *p*16, *p*18, *p*19 remain at negative potential. The subsequent elements of a complex signal are generated in a similar manner.

Figure 8:
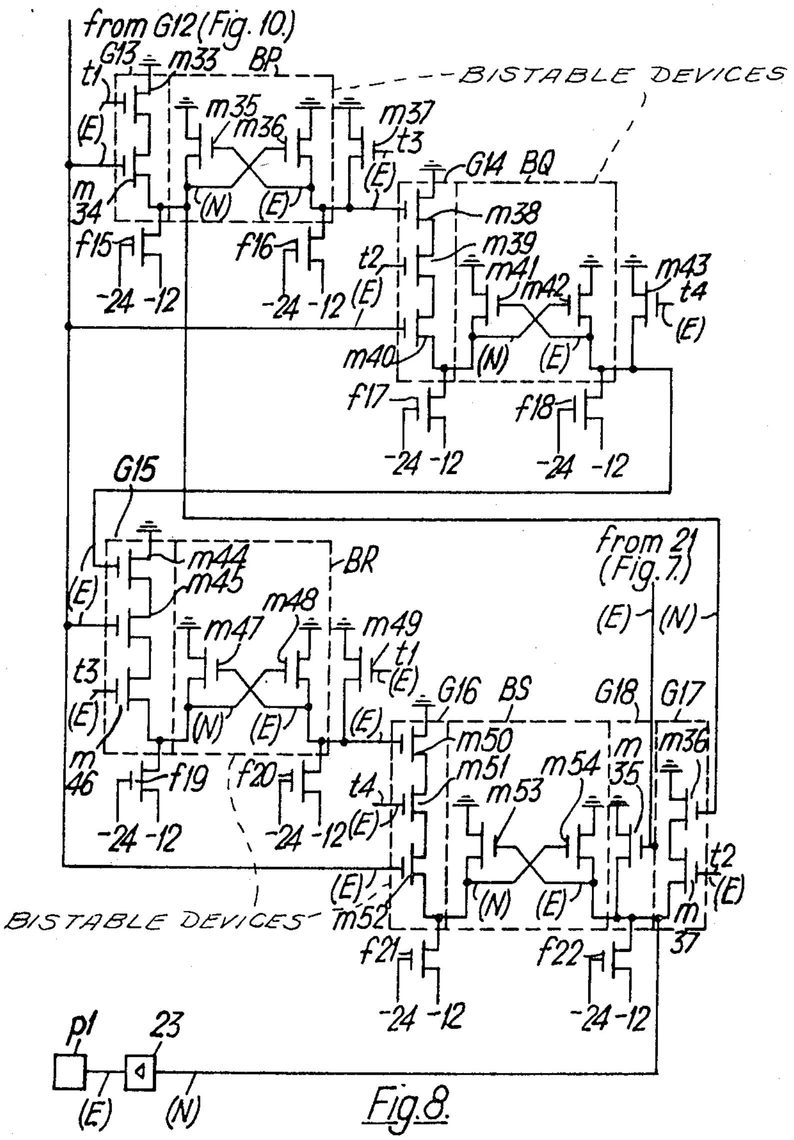

Considering now the receipt of a complex signal, the signal elements are received at pads *p*10 – *p*14 (FIGS. 6*a*, 7), gates G9 - G11 and G8 responding as already described. Use is made, also as already described, of the stepping train comprising the four bistable devices BP, BQ, BR, BS (FIG. 6*b*). As shown in FIG. 8, the train is composed of four pairs of cross-connected Mosts *m*35, *m*36; *m*41, *m*42; *m*47, *m*48; *m*53, *m*54.

Figure 10:
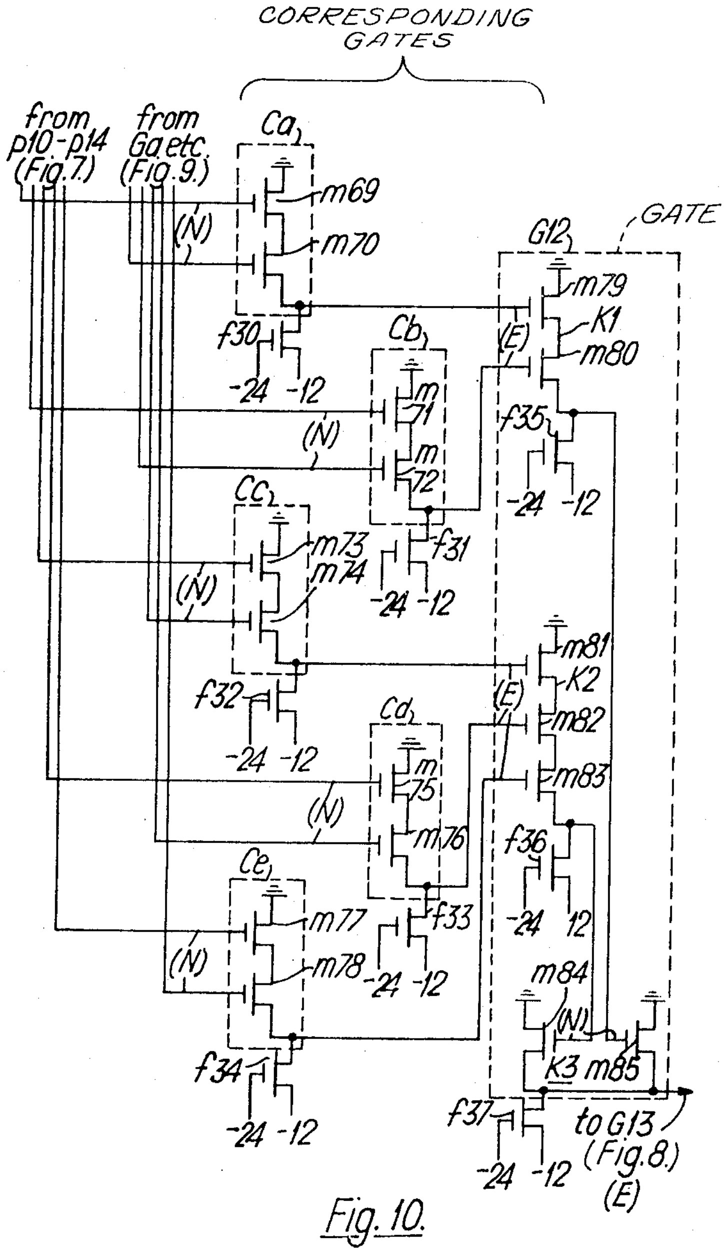

Correspondence between a received signal element and an element read simultaneously from the adjustment gates is effected by the circuitry shown in FIG. 10. This circuitry operates by distinguishing the two conductors which carried the pulses of a received signal element, and by checking that the remaining three conductors carried no pulse and that none of the three adjustment gates relating to these three conductors was marked. The correspondence gates are arranged to deliver the same output potential in respect of both these conditions. Hence when a received signal element is the same as that read from the adjustment gates, the outputs of the correspondence gates are all the same as each other.

In greater detail there is a correspondence gate *Ca* – *Ce* for each conductor *a, b, c, d, e* of a highway capable of carrying a complex signal. A correspondence gate comprises two series-connected Mosts. One Most of each pair has its gate connected to the relevant one of the pads *p10* – *p14* (FIG. 6a, 7) at which pulses of signal elements are received. The other Most of each pair has its gate connected to the drain of the Most associated with the relevant row of the array of adjustment gates. Typically, the correspondence gate *Ca*, which relates to the *c* conductor of the highway, comprises two series-connected Mosts *m69, m70*. The gate of Most *m69* is connected to pad *p10* (FIGS. 6a, 7). The gate of Most *m70* is connected to the drain of Most *m66* (FIG. 9). The other four correspondence gates Cb - Ce comprise pairs of Mosts m71, m72; m73, m74; m75, m76; *m77, m78* which are correspondingly connected. The outlets of gates *Ca* – *Cb* are connected to the gates of two series connected Mosts *m79, m80* which form a first AND gate K1. The outlets of gates Cc, C*d*, C*e* are connected to the gates of three series-connected Mosts *m81, m82, m83* which form a second AND gate K2. The outlets of gates K1, K2 are connected to the gates of two Mosts *m84, m85* which are disposed in parallel with each other and form a third AND gate K3. The outlet of gate K3 is connected to an inlet of gate G13 (FIGS. 6a, 8) which is associated with the stepping train BP–BS. In the absence of signals, negative potential from pad *p10* (FIG. 6a, 7) is applied to the gate of Most *m69*; and negative potential from the drain of Most *m66* (FIG. 9) is applied to the gate of Most *m70*. Consequently the outlet of the correspondence gate C*a* stands at earth potential. Similarly, the outlets of correspondence gates C*b* – C*e* also stand at earth potential, which potential is also assumed by the outlet of the third AND gate K3.

When a signal element is received at pads *p10* – *p14* (FIGS. 6a, 7) the two pads at which the pulses comprising the element are received, are caused to assume earth potential. The remaining three pads remain at negative potential. At this stage, it is convenient to consider in detail the working of the correspondence gate C*a*, as being typical of the working of all the correspondence gates. If a pulse is received at pad *p10*, the pad assumes earth potential and the Most m69 becomes non-conductive. Consequently the outlet of the gate C*a* changes to negative potential. With Most *m69* non-conductive, the potential applied to the base of Most m70 has no effect on the output potential of the gate C*a*, and may therefore be disregarded. On the other hand, if no pulse is received at pad *p10*, the pad remains at negative potential, the Most *m69* remains conductive, and the output potential of the gate C*a* is determined by the action of the Most *m70*. If the relevant adjustment gate is not marked, then as has already been described in connection with FIG. 9, the Most *m66* conducts and its drain assumes earth potential. The Most *m70* therefore becomes non-conductive and the output of the gate C*a* assumes negative potential. In other words, if no pulse is received and no pulse results from the reading of the relevant adjustment gate, the output of the gate C*a* assumes negative potential. But if the relevant adjustment gate is marked, the Most *m66* (FIG. 9) does not conduct; its drain potential remains negative and the Most *m70* continues to conduct. Consequently the output of the gate C*a* remains at earth potential. The same considerations apply to pads *p11* – *p14* and their respective correspondence gates C*b* – C*e*.

Returning now to the reception of a signal element at pads *p10* – *p14* (FIGS. 6a, 7), let it be assumed that the received element represents the digit value 0, and that the element is received at time pulse *t1*. Reference to FIG. 5 shows that the digit value 0 is represented by pulses on the *d, e* conductors. Therefore, the pads *p13, p14* assume earth potential. As a result, the outlets of the correspondence gates C*d*, C*e* change to negative potential. This change is due solely to the reception of pulses at the pads *p13, p14*, and takes place whether or not the adjustment gates A*d*P, A*e*P are marked. No pulses are received at pads *p10, p11, p12* in respect of the *a, b, c* conductors, and the gate potentials of Mosts *m69, m71, m73* therefore remain negative. Now if the adjustment represents the digit value 0, none of the adjustment gates A*a*P, A*b*P, A*c*P is marked with earth potential. Therefore, Most *m66* (FIG. 9) in respect of the *a* conductor, and the corresponding Mosts (not shown) in respect of the *b, c* conductors, all change their drain potentials to earth. Consequently the correspondence gates C*a*, C*b*, C*c* all change their output potentials to negative. The situation now is that all five of the correspondence gates C *a* – C*e* are delivering negative potential. As a result, the gates K1, K2 both open and are followed by gate K3, which delivers negative potential as a correspondence signal to gate G13 (FIG. 8). On the other hand, if the adjustment represents any digit other than 0, at least one of the adjustment gates A*a*P, A*b*P, A*c* P will be marked with earth potential. If the gate A*a*P, is so marked (as shown in FIG. 9), the Most *m66* will not become conductive. Therefore, in the correspondence gate C*a*, the two inputs remain at earth potential. Hence the gate K1 fails to open; the gate K3 also fails to open, and no correspondence signal is delivered. In other words, in any case where the digit value represented by a received signal element is different from the adjustment of the adjustment gates, at least one of the correspondence gates C*a* and C*e* will maintain its outlet at earth potential; one of the gates K1, K2 will fail to open; the gate K3 remains closed, and no correspondence signal is delivered.

With reference to the gate G12 (FIG. 6a), the reader will appreciate that a five-input gate, which opens when two input signals are present, requires an analogue technique if the logical function is to be effected in one stage. The arrangement just described has been adopted because analogue techniques are incompatible with the use of Mosts.

Alternatives

It is possible to connect the outlets of the correspondence gates C*a* – C*e* (FIG. 10) to an array of two-input AND gates, the array comprising one gate for each code combination of FIG. 5. The outputs of the AND gates would be taken to an OR gate. This arrangement, however, requires more Mosts than the arrangement described above. Again the gates K1, K2 (FIG. 10)

could be replaced by one five-input AND gate. In this case the gate K3 would not be required, but the outlet of the AND gate would be connected to an inverter.

Referring now to the circuit arrangements shown in FIG. 6a, by which (amongst others) the bistable device BA is set to the "0" state by the action of jacking-in the card 2 at its working position, it will be noticed that a pad p41 is provided exclusively for this circuit. In general it is desirable to keep to a minimum the number of pads provided on an integrated circuit chip. The arrangement shown in FIG. 11 enables the pad p41 to be dispensed with. In FIG. 11 only those parts of the circuitry of FIG. 6a are shown that are required for an understanding of the alternative arrangement. A circuit component which appears in both FIGS. 6a, 11 bears the same references in both. The pad p41 is dispensed with by using simultaneously two other pads which are otherwise not used at the same time as each other. Referring to FIG. 11, the pads p3, p4 carry the time pulses t1, t2 respectively, and are therefore not used at the same time as each other. Instead of being connected directly to the pads p3, p4, the terminals v3, v4 are connected as inputs to the respective one of two OR gates ga, gb. The junction of the capacitor C and resistor r1 is connected as an input to both of the gates ga, gb. The outlets of the gates ga, gb are taken respectively to inverters na, nb, and thence to the pads p3, p4. If the card 2 carries more than one chip 7, the outputs from the inverters na, nb may be taken to each of the chips. Being mounted on the card 2, the gates ga, gb and inverters na, nb are made of discrete components. Within the chip 7, the pads p3, p4 are connected respectively to the gates of two Mosts m86, m87. The two Mosts are connected in series and from an AND gate q. The outlet of the gate q is connected to the gate of the Most m3 in the reset circuit 21. It will be seen that the application of the time pulses t1, t2 is unaffected by this arrangement, and that the gate q does not respond to either time pulse alone. The action of jacking-in the card 2 at its working position causes negative potential to be delivered by the re-set circuit 21 to the gates G4 (FIG. 7) G18(FIG. 8) - as already described. After a suitable interval, the potential at the junction of the capacitor C and resistor r1 attains, on account of the charging of the capacitor C, a value which opens both of the gates ga, gb, thereby opening the gate q and switching the Most m3 in the re-set circuit 21. This switching replaces the negative potential delivered to the gates G4 (FIG. 7), G18 (FIG. 8) by earth potential. The potentials shown in FIG. 11 are the potentials obtaining subsequent to this switching. It will be appreciated that while both the gates ga, gb are open, spurious signals will be distributed within the chip 7 over the leads by which the time pulses t1, t2 are distributed. But as no signal is being converted by the card at the time of jacking-in, no signals are mutilated.

What is claimed is:

1. An adjustable telecommunication signal converter operable firstly to convert a single pulse input signal received thereat into a complex signal comprising a succession of signal elements delivered over a group of conductors, each element including one or more pulses applied respectively to one or more conductors of the group selected in dependence on an adjustment of the converter, and secondly to convert a complex signal received at the converter into a single pulse output signal if the conductors of the group to which the pulses of the elements of the received signal are applied correspond in respect of each element to the conductors selected in dependence on the adjustment to which the converter has been adjusted, which adjustable telecommunication converter comprises: adjustment means adjustable to determine said adjustment and to select in respect of each pulse of an element of a complex signal delivered by the converter a conductor of the group to which a pulse is applied; delivery gates repeatedly and selectively operable on the receipt of a single pulse input signal to deliver at each operation an element of a complex signal whose pulses are applied to conductors selected in dependence on the adjustment of the adjustment means; correspondence gates operable to generate a correspondence signal in response to each element of a received complex signal if the pulses included in an element are applied to conductors which correspond to conductors selected in dependence on the adjustment of the adjustment means; and a stepping train having a number of steps equal to the number of elements in a complex signal, the stepping train advancing one step in response to a correspondence signal and achieving the final step only if a correspondence signal is generated in respect of each element of a received complex signal, a single output pulse signal being delivered when the stepping train achieves the final step.

2. A converter as claimed in claim 1 comprising a jack-in card supporting an integrated circuit chip, and adjustment means; the chip including delivery gates comprising metal oxide silicon transistors disposed in series configuration, correspondence gates comprising metal oxide silicon transistors in series configuration, and a stepping train having a number of steps each comprising a pair of mutually cross-connected metal oxide silicon transistors; and the adjustment means comprising at least one plug supported by the card on a jack-in basis, said plug having conductive connections between a datum terminal and selected code terminals.

3. Telecommunication signal conversion apparatus which includes an array of independently adjustable signal converters as claimed in claim 1, an input terminal corresponding to each converter of the array and individually connected thereto, an output terminal corresponding to each converter of the array and individually connected thereto, a delivery group of conductors multipled over the converters of the array and a receive group of conductors multipled over the converters of the array, the apparatus responding firstly to a single pulse input signal received at an input terminal to deliver a complex signal at the delivery group of conductors, the pulses of the elements of the delivered complex signal being applied to conductors selected in dependence on the adjustment of the adjustment means of the converter to which the said input terminal is connected, and secondly to a complex signal received over the receive group of conductors to deliver a single pulse output signal at the output terminal connected to that converter of the array whose stepping train is advanced to the final step by correspondence signals relating to the elements of the received complex signal.

* * * * *